United States Patent
Shimono

(10) Patent No.: US 8,328,227 B2
(45) Date of Patent: Dec. 11, 2012

(54) SIDE AIRBAG APPARATUS FOR A VEHICLE

(75) Inventor: Hiroyoshi Shimono, Kasumigaura Ibaraki (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/524,825

(22) Filed: Jun. 15, 2012

(65) Prior Publication Data

US 2012/0256400 A1   Oct. 11, 2012

Related U.S. Application Data

(62) Division of application No. 12/702,582, filed on Feb. 9, 2010, now Pat. No. 8,226,114, which is a division of application No. 11/667,208, filed on Dec. 5, 2007, now Pat. No. 8,056,923.

(30) Foreign Application Priority Data

Nov. 4, 2004   (JP) ................................. 2004-321317
Oct. 28, 2005  (WO) .................. PCT/JP2005/019873

(51) Int. Cl.
*B60R 21/233* (2006.01)
*B60R 21/207* (2006.01)

(52) U.S. Cl. ..................................... 280/729; 280/730.2

(58) Field of Classification Search .................. 280/729, 280/730.2; *B60R 21/233, 21/207*
See application file for complete search history.

(56) References Cited

U.S. PATENT DOCUMENTS

| | | | |
|---|---|---|---|
| 6,270,113 B1 | 8/2001 | Wipasuramonton et al. | |
| 6,341,797 B1 | 1/2002 | Seo | |
| 6,478,329 B1 | 11/2002 | Yokoyama | |
| 6,802,529 B2 * | 10/2004 | Takedomi et al. | 280/729 |
| 6,976,702 B2 * | 12/2005 | Yokota et al. | 280/730.2 |
| 7,152,876 B2 * | 12/2006 | Hofmann | 280/743.1 |
| 7,347,444 B2 * | 3/2008 | Wheelwright | 280/729 |
| 7,770,921 B2 * | 8/2010 | Mueller et al. | 280/739 |
| 2002/0017797 A1 | 2/2002 | Jach et al. | |
| 2004/0119269 A1 | 6/2004 | Yokota et al. | |
| 2004/0124615 A1 | 7/2004 | Tanase et al. | |
| 2004/0232666 A1 * | 11/2004 | Sato et al. | 280/730.2 |
| 2005/0006883 A1 | 1/2005 | Sato et al. | |
| 2005/0121888 A1 | 6/2005 | Sato et al. | |
| 2005/0134021 A1 * | 6/2005 | Acker et al. | 280/728.2 |
| 2005/0248132 A1 | 11/2005 | Wheelwright | |
| 2012/0038135 A1 * | 2/2012 | Oomori et al. | 280/730.2 |

(Continued)

FOREIGN PATENT DOCUMENTS

EP   0940229   9/1999

(Continued)

*Primary Examiner* — Joseph Rocca
*Assistant Examiner* — Joselynn Y Sliteris
(74) *Attorney, Agent, or Firm* — Brinks Hofer Gilson & Lione

(57) ABSTRACT

In at least one embodiment, the present invention provides a side airbag apparatus for a vehicle having a seat with a back rest part and a hinge mechanism. The side airbag includes an inner sleeve forming a separation element defining one of a front airbag chamber and a rear airbag chamber within the side airbag. A connecting passage connects the front and a rear airbag chambers adjacent a lower extremity of the separation element. An attaching portion provided on the rear portion of the rear airbag chamber attaches the side airbag to the backrest part. An inflator proximate the attaching portion injects gas into the rear airbag chamber which flows through the connecting passage into the front airbag chamber.

2 Claims, 2 Drawing Sheets

U.S. PATENT DOCUMENTS

2012/0181780 A1 * 7/2012 Rickenbach et al. ...... 280/730.2

FOREIGN PATENT DOCUMENTS

| | | |
|---|---|---|
| JP | 11-091493 | 4/1999 |
| JP | 11-152005 | 6/1999 |
| JP | 11-157407 | 6/1999 |
| JP | 2000-318565 | 11/2000 |
| JP | 2003-182499 | 7/2003 |
| JP | 2004-189183 | 7/2004 |
| JP | 2004-196162 | 7/2004 |
| WO | WO 99/15370 | 4/1999 |
| WO | WO 2004/062970 | 7/2004 |
| WO | WO 2004/065179 | 8/2004 |

* cited by examiner

SIDE AIRBAG APPARATUS FOR A VEHICLE

CROSS REFERENCE TO RELATED APPLICATIONS

This application is a divisional application of and claims priority to U.S. patent application Ser. No. 12/702,582 filed Feb. 9, 2010, now U.S. Pat. No. 8,226,114 which is a divisional application of and claims priority to U.S. patent application Ser. No. 11/667,208 filed May 4, 2007, now U.S. Pat. No. 8,056,923 which claims priority to PCT Patent Application PCT/JP2005/19873 filed Oct. 28, 2005, and Japan Patent Application 2004-321317 filed Nov. 4, 2004.

FIELD OF THE INVENTION

The present invention relates to a side airbag apparatus for a vehicle.

BACKGROUND OF THE INVENTION

Japanese Patent Publication No. 2000-318565 describes an airbag apparatus designed for fast deployment to protect the head of the vehicle occupant. This airbag apparatus incorporates a tube-shaped 1st gas channel formed along the edge of the airbag corresponding to the occupant's head, a 2nd gas channel formed along the boundary area of the airbag corresponding to occupant's head and shoulder and having one end connected to the 1st gas channel, a gas inlet port connected to the 1st gas channel as means of directing gas from the inflator. An upper gas exhaust port connected to the airbag corresponding to the occupant's head and a lower gas exhaust port connected to the airbag corresponding to the occupant's shoulder are formed in the 2nd gas channel.

U.S. Pat. No. 6,270,113 describes a side airbag apparatus which is designed to completely deploy along the vertical plane before deploying completely in the forward direction. The airbag structure includes a 1st side panel, a 2nd side panel, a cylindrical panel, and a partition panel. The undeployed airbag is stored in a compressed state, and when deployed, enters the space between the occupant and the side of the vehicle. The outer portion of the airbag is formed by the joining of the 1st and 2nd side panels, the rear portion of the airbag is formed by the joining of the rear edges of the 1st and 2nd side panels, and the bottom of the airbag is formed by the joining of the bottom edges of the 1st and 2nd side panels. A part of the bottom portion of the airbag is open to receive inflation gas from an attached inflator, and both sides of the cylindrical panel are fixedly attached to corresponding positions of the 1st and 2nd side panels in order to form a cylindrical part extending upward along the rear edge of the airbag. The partition panel is attached to the 1st and 2nd side panels and the cylindrical panel so as to define and separate upper and lower airbag chambers disposed in front of the cylindrical part.

The above-noted side airbag structures, particular the type designed to restrain the occupant's hip region on the seat cushion, exhibit the following shortcomings when installed to a seat having a mechanical device located at the lower part of the backrest.

A fold flat seat, that is, the type of seat in which the backrest part folds down to a horizontal position over the seat cushion part, requires that the fold-flat hinge is attached at a point above the joint of the reclining mechanism on the side of the backrest. The inflator of the side airbag apparatus and the side airbag itself are attached to the side of the backrest. As a result, the side airbag and inflator must be installed to the backrest at a point well above the seat cushion and the fold-flat hinge. Because this installation requires that there is a long distance between the airbag attachment point and the seat cushion part to be restrained by the airbag, a problem arises in that it takes a relatively long period of time for the deployed side airbag to reach the part of the seat near the occupant's hips.

The inflation gas must flow predominantly in the downward direction in order for the side airbag to reach the hip region quickly, but because the fold-flat hinge is positioned directly beneath the side airbag and inflator, it becomes necessary to structure the side airbag in a way which avoids the area around the fold-flat hinge. Structuring a side airbag apparatus in this manner, however, raises another problem that the inflation gas flows in a forward direction (toward the front of the vehicle) along the configuration of the side airbag, rather than in the desired downward direction. Thus, a greater amount of time is required for the airbag to reach the seat occupant's hip region.

Accordingly, there is a need for a side airbag system which addresses these shortcomings. In consideration of the above noted shortcoming, the side airbag apparatus for a vehicle invention has been designed for installation to a vehicle seat having a fold flat hinge mechanism of the type which allows the backrest to fold down flat over the seat cushion. The purpose of the side airbag apparatus invention is to deploy the side airbag quickly to the region adjacent to the seat cushion in vehicular applications where an airbag is intended to provide adequate occupant restraint at the seat cushion.

SUMMARY OF THE INVENTION

In at least one embodiment of the present invention a side airbag apparatus is provided. The side airbag apparatus is for a vehicle having a side airbag attached to a side of a backrest part of a vehicle seat at a position above a mechanism which is mounted on a lower part of the side of the backrest. The side airbag apparatus invention includes separation means by which a front airbag chamber and a rear airbag chamber are defined within the side airbag. A connecting passage connects the front and rear airbag chambers at a lower extremity of the separation means. An attaching portion, located on the upper rear portion of the rear airbag chamber, attaches the side airbag to the backrest part of the vehicle seat, and an inflator drives gas into the rear airbag chamber. The inflator is installed proximate the attaching portion.

In one aspect, the separation means has a sewn portion binding at least one part of mutual bag surfaces of the front and rear airbag chambers.

In another aspect, the separation means is a tether which forms at least one part of a wall which defines the front and rear airbag chambers.

In yet another aspect, the separation means is an inner bag which defines either the front or rear airbag chamber. The inner bag incorporates a connecting port which serves as the connecting passage from one of the airbag chambers to the other.

In a further aspect, the rear airbag chamber incorporates a downward leading flow channel which extends from the rear airbag chamber to the connecting passage as means of applying gas flow pressure generated in the rear airbag chamber to operate the lower portion of the side airbag.

In a further aspect, the separation means is formed as a multi-angular structure extending toward the front of the vehicle while leading downward from the top of the rear airbag chamber to the bottom as a means of directing the gas flow in a downward direction.

In another aspect, the rear airbag chamber has a larger volumetric capacity in the vicinity of the attaching portion than in the vicinity of the connecting passage.

In yet another aspect, the mechanism located at the lower part of the backrest of a vehicle seat is a fold-flat hinge mechanism through which the backrest part of the seat is able to fold down over the seat cushion.

BRIEF DESCRIPTION OF THE DRAWINGS

Further objects, features and advantages will become apparent from consideration of the following description and the appended claims when taken in connection with the accompanying drawings.

DETAILED DESCRIPTION OF THE INVENTION

Detailed embodiments of the present invention are disclosed herein. It is understood however, that the disclosed embodiments are merely exemplary of the invention and may be embodied in various and alternative forms. The figures are not necessarily to scale; some figures may be exaggerated or minimized to show details of a particular component. Therefore, specific structural and functional details disclosed herein are not to be interpreted as limiting but merely as a representative basis of the claims and for teaching one skilled in the art to practice the present invention.

The side airbag apparatus for a vehicle invention is intended for installation to a vehicle seat of the type having a mechanism, for example, a hinge mechanism which allows the backrest to fold down flat over the seat cushion. In cases where it is required that an airbag provide occupant restraint in the area adjacent to the seat cushion, the side airbag apparatus invention is able to quickly deploy the side airbag to this area.

The present invention seeks to overcome some of the concerns associated with protection of a vehicle occupant via a side airbag while allowing for a seat designed with a hinge mechanism to fold the backrest over the seat cushion.

Figure 1:
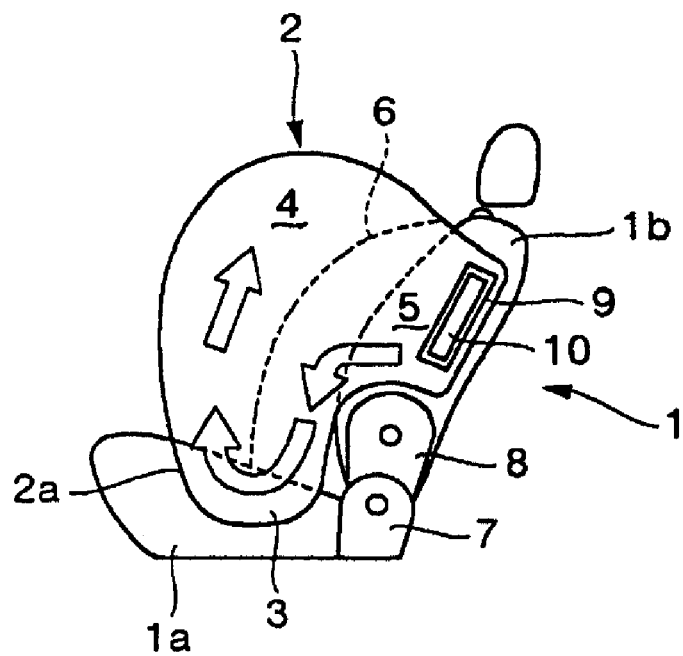
FIG. 1 is a side view of an embodiment of the side airbag apparatus for a vehicle in accordance with the present invention.

Employing the principles of the present invention is a side airbag apparatus for a vehicle. As illustrated in FIG. 1, at least one embodiment of the present invention has a side airbag 2 (hereafter referred to as the "airbag") installed to a seat 1 on the side of a backrest 1b above a fold-flat hinge 8 located at the lower portion of the side of the backrest 1b. The airbag 2 includes a front airbag chamber 4 (hereafter referred to as the "front chamber"), a rear airbag chamber 5 (hereafter referred to as "the rear chamber"), a sewn portion in the form of a stitched joint 6 which serves as the separation means defining the front and rear chambers 4 and 5 in the airbag 2, a connecting passage 3 which connects the front and rear chambers 4 and 5 beneath the lower terminating end of the stitched joint 6, an attaching portion 10 which is located at the rearward upper portion of the rear chamber 5 and through which the airbag 2 is attached to the backrest 1b, and an inflator 9 which is installed adjacent to the attaching portion 10 as means of injecting gas into the rear chamber 5. Fold-flat hinge 8, which is a mechanism allowing the backrest 1b to fold down flat against the seat cushion 1a, is typically disposed at the lower side portion of the backrest 1b and above the backrest recliner hinge 7. In this embodiment, the terms 'front' and 'rear' refer respectively to the front and back portions of the vehicle, and the terms 'upper' and 'lower' refer respectively to the upper and lower portions of the vehicle.

The airbag 2, in a normally folded and undeployed state, is preferably attached to and supported, together with the inflator 9, by the side of backrest 1b, at a point above the fold-flat hinge 8, through the attaching portion 10. As previously noted, the airbag 2 and inflator 9 may be installed to the backrest 1b at a location above the fold-flat hinge 8 at a point above and largely separated from the seat cushion 1a, because of the installation of the fold-flat hinge 8. FIG. 1 illustrates the airbag 2 in a deployed (inflated) state. When deployment initiates, gas from the inflator 9 enters the airbag 2, expands the airbag 2 from its attachment point on the backrest 1b towards the forward and lower parts of the vehicle, thus protecting the occupant by inflating the airbag 2 into the region between the occupant in the seat 1 and the side of the vehicle.

In this embodiment, both bag surfaces of the airbag 2 are mutually joined by a stitched joint 6 along a line running downward from the top extremity of the airbag 2 to a point ending above the bottom extremity of the airbag 2, thus leaving the sides of the lower airbag part 2a unjoined. The stitched joint 6 separates the airbag 2 into the front chamber 4 and the rear chamber 5. In other words, the airbag 2 is a single structure combining the forward and rear chambers 4 and 5 by means of the stitched joint 6. The lower airbag part 2a, that is, the part which lies in the vicinity of the seat cushion 1a when deployed, is not partitioned by the stitched joint 6, and thus forms a connecting passage 3 which acts as a passageway between the forward and rear chambers 4 and 5. The airbag 2 is attached to the backrest 1 through a rear-side upper portion of the rear chamber 5. At airbag 2 deployment, the gas generated by the inflator 9 enters the airbag 2 through the rear chamber 5.

This structure has the effect of directing the gas generated by the inflator 9 to a downward direction along the stitched joint 6 within the rear chamber 5. The pressure of the downward flow of gas inflates the rear chamber 5 while simultaneously driving the entirety of airbag 2 in a downward direction, thus promoting the inflation of the airbag 2 in a downward direction. Therefore, even though the inflator 9 and the airbag 2 are attached at a point largely separated from the seat cushion 1a, the lower airbag part 2a is able to quickly reach the area adjacent to the seat cushion 1.

Once the lower airbag part 2a inflates to the vicinity of the seat cushion 1a, the gas within the rear chamber 5 flows into the front chamber 4 through the connecting passage 3, thus the front chamber 4 inflates. The airbag 2 thus assumes a completely inflated condition through this sequence of events. The front chamber 4 inflates after the rear chamber 5, which is attached to and supported by the backrest 1b, and assumes a stable and fully inflated condition, thus providing an inflation mechanism able to suppress the tendency of the entire airbag 2 to rise upward when deployed.

Figure 2:
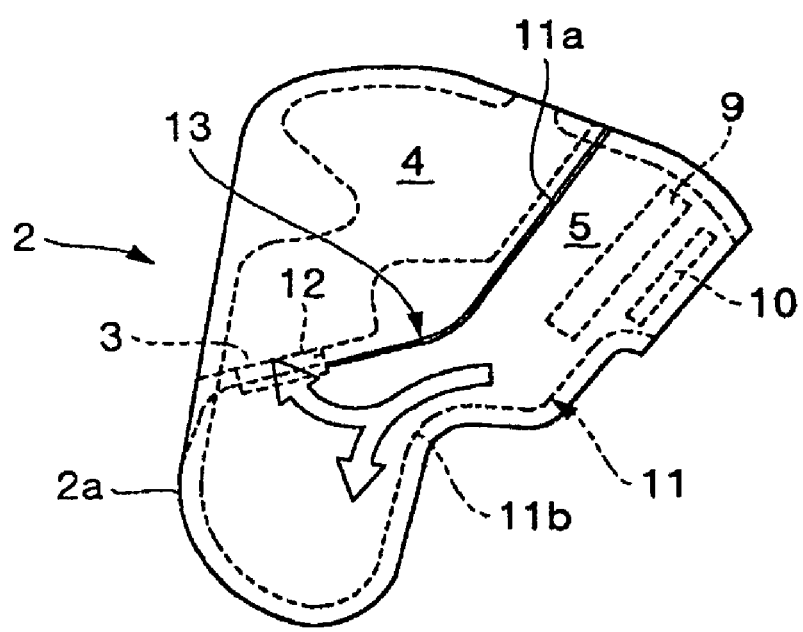
FIG. 2 is a side view of another embodiment of the side airbag apparatus for a vehicle in accordance with the present invention.

FIG. 2 describes another embodiment of the side airbag apparatus for a vehicle in accordance with the present invention. In this embodiment, the separating means defining the front chamber 4 and rear chamber 5 is an inner bag 11 within the airbag 2. The inner bag 11 forms the front chamber 4 or the rear chamber 5, or both chambers 4 and 5. An open connecting port 12 is formed to the inner bag 11 defining either one of the chambers 4, 5 within the airbag 2 in order to provide a connecting passage 3 to the opposing chamber.

FIG. 2 illustrates an example of a structure in which the inner bag 11 is installed within the rear portion of the airbag 2 to form the rear chamber 5. In this embodiment, the airbag 2 may be formed by placing the inner bag 11 between left and right airbag pieces, and stitching the inner bag 11 to the edges of the airbag 2 to form a joint there between. The front chamber 4 and the rear chamber 5 are thus formed within the airbag 2 through this structure. Moreover, the open connecting port 12, which leads into the front chamber 4, is formed as part of the inner bag 11. The gas, which expands the lower airbag part 2a to the region adjacent to the seat cushion 1a, is directed into the front chamber 4 through the open connecting port 12.

A downward leading flow channel 13 (hereafter referred to as the "downflow channel"), which extends in a downward direction to the vicinity of the lower airbag part 2a, is provided as means by which the pressure of the gas flowing towards the open connecting port 12 within the rear chamber 5 can be applied to operate the lower airbag part 2a. The inner bag 11, which forms the rear chamber 5, includes a leading edge 11a opposing the internal region of the front chamber 4, extending downward from the top of the airbag 2, and traversing along the front edge of the airbag 2 with a bulging profile extending toward the rear chamber 5. Moreover, the trailing edge 11b of the inner bag 11 follows the rear edge of the airbag 2 in a curved forward-bulging profile which provides clearance for operation of the fold-flat hinge 8. This structure allows the upper portion of the rear chamber 5, to which the inflator 9 is positioned, and the lower portion of the rear chamber 5, which is formed by the lower airbag part 2a in the vicinity of the seat cushion 1a, to have a relatively large internal volume. The downflow channel 13 extends downward at an inclined angle between the aforesaid upper and lower portions in the region constricted by the above-noted bulging profiles.

In this configuration, the gas from the inflator 9 is guided downward from the upper to the lower part of the rear chamber 5 by the downflow channel 13. The downwardly directed flow of gas, and the pressure of the gas which has filled and inflated the lower part of the rear chamber 5, continue to operate by pushing the entire airbag 2 downward, thus promoting the inflation of the airbag 2 in a downward direction.

Moreover, the trailing edge 11b of the inner bag 11 is specifically shaped so as not to be hindered by the fold-flat hinge 8 when the airbag 2 is deployed. This shape thus prevents the fold-flat hinge 8 from interfering with the inflation of the airbag 2 up to the side of the seat cushion 1a, and promotes smooth and unhindered deployment of the airbag 2. This embodiment avoids the fold-flat hinge 8 and allows the gas flow pressure within the rear chamber 5 to be applied in a manner which prevents the airbag 2 from rising upward and forward when deployed. Therefore, even though the inflator 9 and the airbag 2 are installed at a position above and largely separated from the seat cushion 1a, the lower airbag part 2a is able to deploy quickly to the vicinity of the seat cushion 1a.

When the inflating lower airbag part 2a reaches the vicinity of the seat cushion 1a, the gas in the rear chamber 5 flows into and inflates the front chamber 4 through the upward-facing open connecting port 12. When this inflation sequence is completed, the airbag 2 is in a completely deployed condition.

Figure 3:
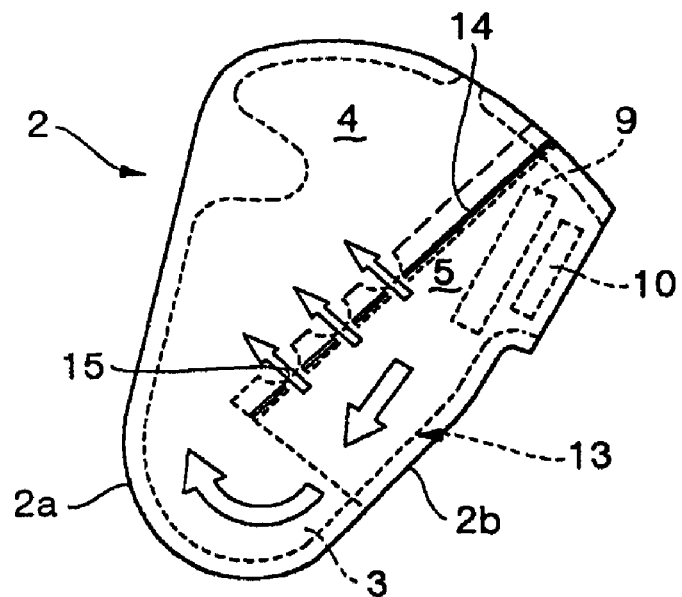
FIG. 3 is a side view of another embodiment of the side airbag apparatus for a vehicle in accordance with the present invention.

FIG. 3 illustrates another embodiment of the side airbag apparatus for a vehicle in accordance with the present invention. In this embodiment the separation means separating the front chamber 4 from the rear chamber 5 is in the form of a tether 14 which traverses within the airbag 2 and forms at least one part of the wall defining chambers 4 and 5. The tether 14 extends from the top of the airbag 2 toward the bottom and terminates at a point above the lower airbag part 2a. The tether 14 thus creates a structure in which the internal spaces of the front chamber 4 and rear chamber 5 are connected via the connecting passage 3 in the lower airbag part 2a (where the tether 14 is not existed) adjacent to the seat cushion 1a.

The tether 14 extends downward in a substantially straight path which may be inclined toward the front of the vehicle from the upper rear part of the airbag 2 to the lower part thereof. The connecting passage 3 is formed between the lower end of the tether 14 and the bottom of the airbag 2. Multiple vent holes 15 may be formed at specific intervals along the length of the tether 14. The vent holes are preferably of smaller cross-sectional area dimension than the connecting passage 3. The trailing edge 2b of the airbag 2 has a straight profile which extends downward at an inclined angle toward the seat cushion 1a and does not provide clearance for operation of the fold-flat hinge 8. This structure therefore forms the connecting passage 3 as a channel leading downward toward the lower airbag part 2a. In this embodiment, the downflow channel 13 is defined as the space between the trailing edge 2b of the airbag 2 and the tether 14.

In this structure, the gas generated by the inflator 9 flows downward along the tether 14 within the rear chamber 5, the pressure of the gas inflates the rear chamber 5 while also pushing the entire airbag 2 in a downward direction, thus promoting the inflation of the entire airbag 2 downward. Therefore, even though the inflator 9 is installed at a significant distance from the seat cushion 1a, the lower airbag part 2a is still able to inflate and quickly reach the area adjacent to the seat cushion 1a.

When the lower airbag part 2a has expanded and reached a position adjacent to the seat cushion 1a, the gas within the rear chamber 5 flows into front chamber 4 in a back-and-forth pattern due to the downward leading orientation of the connecting passage 3. This leads to the complete inflation of the airbag 2. In order to pre-pressurize the front chamber 4 as means of smoothing and hastening its inflation, this embodiment also provides a structure in which gas from the rear chamber 5 may be directed into the front chamber 4 through the vent holes 15 formed in the tether 14.

In this embodiment, the downflow channel 13 is defined as the space formed between the straight tether 14 and the straight airbag trailing edge 2b, and the connecting passage 3 leads downward. As a result, this embodiment provides a structure which may more effectively promote the downwardly inflating speed and suppresses the tendency of the airbag to rise up when deployed due to a downward inflation mechanism which is stronger than that of the second embodiment in which the downwardly leading downflow channel 13 is constricted between two opposing bulging profiles and in which the open connecting port 12 faces upward.

Figure 4:
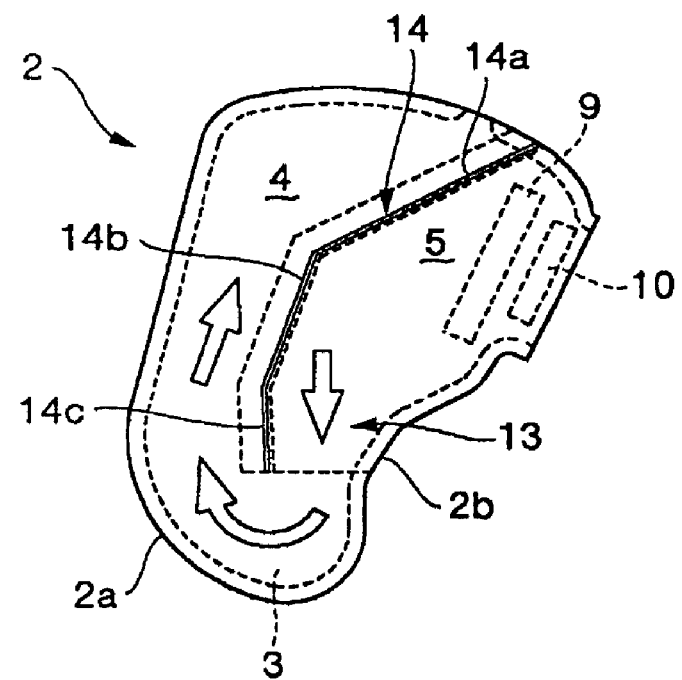
FIG. 4 is a side view of another embodiment of the side airbag apparatus for a vehicle in accordance with the present invention.

FIG. 4 illustrates another embodiment of the side airbag apparatus for a vehicle in accordance with the present invention. This embodiment includes the tether 14 as means of directing the flow of gas within the rear chamber 5 in a downward direction. The tether 14 has a multi-angular profile extending in the forward direction towards the front chamber 4. The tether 14 comprises an upper portion 14a which inclines gently downward toward the front chamber 4 from the top of the airbag 2, a middle portion 14b which inclines more steeply downward from the lower extremity of the upper portion 14a, and a lower portion 14c which extends downward from the lower extremity of the middle portion 14b in a predominantly vertical orientation. The trailing edge 2b of the airbag 2 may be formed to a curved profile that extends forward and upward in order to avoid the interference of the fold-flat hinge 8 to the airbag deployment.

A downflow channel 13 is defined by the lower portion 14c and the trailing edge 2b of the airbag 2. This embodiment uses the tether 14 to prevent the gas generated by the inflator 9, which is located above the trailing edge 2b, from flowing in a forward direction, that is, toward the front of the vehicle. Instead, the tether 14 directs the gas in an increasingly downward direction by guiding it along the upper portion 14a, the middle portion 14b, and the lower portion 14c where the gas flows down in a predominantly vertical direction. This configuration directs the forward flowing gas in a downward direction and guides the gas downward by the downflow channel 13 to effectively inflate the airbag 2 in a downward direction using the pressure of the gas flowing into the lower airbag part 2a, and prevents the gas flow entering the front chamber 4 from inflating the airbag 2 in a direction toward the front of the vehicle.

Moreover, due to the shapes of the tether 14 and the trailing edge 2b of the airbag 2, the space within the part of the rear chamber 5 (which is supported by the backrest 1b) in the vicinity of the attaching portion 10 may have a greater volume than that of the connecting passage 3 in the lower airbag part 2a. More rigid support may be provided for the entire airbag 2 by increasing the volume of the part which is first inflated within the rear chamber 5. The mechanism by which the rear chamber 5 and the front chamber 4 are sequentially inflated may have the effect of stabilizing the deployment of the front chamber 4.

In this configuration, the gas expelled from the inflator 9 may be directed downward by the tether 14 to inflate the rear chamber 5, and simultaneously to apply pressure which pushes the entire airbag 2 downward, thus facilitating the downward deployment of the airbag 2. Therefore, even though the inflator 9 and attachment point of the airbag 2 are at a location largely separated from the seat cushion 1a, the lower airbag part 2a may be able to quickly deploy to the region adjacent to the seat cushion 1a.

When the lower airbag part 2a inflates to the area adjacent to the seat cushion 1a, the gas which runs out of the rear chamber 5, through the connecting passage 3, flows into and inflates the front chamber 4 so as to fully inflate the airbag 2.

The invention may be structured as a single airbag 2 which is divided into the separate front chamber 4 and rear chamber 5, or may be formed from two separate airbags, that is, a separately constructed front chamber 4 and rear chamber 5 being connected to form the airbag 2. Either structure may provide the same operational advantages which have been previously described.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined by the following claims.

What is claimed is:

1. A side airbag apparatus for a vehicle having a side airbag attached to a side of a backrest part of a vehicle seat, the apparatus comprising:
   separation element defining a front airbag chamber and a rear airbag chamber within the side airbag,
   a flow channel between a lower extremity of the separation element and a trailing edge of the airbag, a connecting passage connecting the front and rear airbag chambers adjacent the lower extremity of the separation element,
   an attaching portion provided on an upper rear portion of the rear airbag chamber and attaching the side airbag to the backrest part, and
   an inflator proximate the attaching portion for injecting a gas into the rear airbag chamber which flows through the flow channel and the connecting passage into the front airbag chamber,
   wherein the separation element is an inner bag that defines at least one of the front and rear airbag chambers, the inner bag defining a connecting port that forms the connecting passage, wherein the inflator is located at a position corresponding only to an upper half part of the rear airbag chamber and at a rear part of the upper half part of the rear airbag chamber, and the separation element extends downward along a path inclined toward a front of the vehicle from a top extremity of the side airbag, proximate the inflator, to the connecting passage located at a lower part of the side airbag, proximate a seat cushion, and
   wherein the flow channel is formed to extend forward and downward so that the gas flows downward at an inclined angle toward a front of the seat cushion, through the connecting passage into the front airbag chamber, and toward a rear side of the vehicle seat into an area adjacent to the rear airbag chamber and located above a lowermost part of the inflator.

2. The apparatus according to claim 1 wherein the separation element is formed as a multi-angular structure extending both towards the front airbag chamber and downward from a top of the rear airbag chamber to a bottom of the rear airbag chamber to direct the gas flow within the rear airbag chamber in a downward direction.

\* \* \* \* \*